(12) United States Patent
Le Bris et al.

(10) Patent No.: US 8,647,735 B2
(45) Date of Patent: Feb. 11, 2014

(54) HEATING ARTICLE INCLUDING COLOURED HEAT INDICATOR WITH IMPROVED VISABILITY AND PRECISION

(75) Inventors: Stephanie Le Bris, Chambery (FR); Laurent Voisin, Sales (FR); Jean-Luc Perillon, Saint Paul Trois Chateaux (FR)

(73) Assignee: SEB S.A., Ecully (FR)

( * ) Notice: Subject to any disclaimer, the term of this patent is extended or adjusted under 35 U.S.C. 154(b) by 207 days.

(21) Appl. No.: 13/190,381

(22) Filed: Jul. 25, 2011

(65) Prior Publication Data

US 2012/0052265 A1    Mar. 1, 2012

(30) Foreign Application Priority Data

Jul. 26, 2010  (FR) .................................... 10 56091

(51) Int. Cl.
| | |
|---|---|
| B05D 5/00 | (2006.01) |
| A47J 27/00 | (2006.01) |
| A47J 36/00 | (2006.01) |
| B32B 3/00 | (2006.01) |
| B32B 7/00 | (2006.01) |
| C09D 11/00 | (2006.01) |

(52) U.S. Cl.
USPC ........ 428/195.1; 428/199; 428/201; 428/202; 427/261; 427/256; 220/573.1; 106/31.16; 106/31.64

(58) Field of Classification Search
USPC ............... 427/256, 261; 428/195.1, 201, 199, 428/202; 220/573.1; 106/31.16, 31.64
See application file for complete search history.

(56) References Cited

U.S. PATENT DOCUMENTS

| | | | |
|---|---|---|---|
| 2,285,366 | A | 6/1942 | Sheffield |
| 4,063,956 | A | 12/1977 | Higgins |
| 4,851,049 | A | 7/1989 | Wienand et al. |
| 5,851,587 | A | 12/1998 | Schittenhelm et al. |
| 6,551,693 | B1 * | 4/2003 | Buffard et al. .................. 99/342 |
| 2006/0001726 | A1 | 1/2006 | Kodas et al. |
| 2010/0181322 | A1 | 7/2010 | Perillon et al. |

FOREIGN PATENT DOCUMENTS

| | | |
|---|---|---|
| EP | 0 287 336 | 10/1988 |
| EP | 1086994 | 12/2003 |
| EP | 1 405 890 | 4/2004 |
| EP | 1121576 | 5/2008 |
| EP | 2139964 | 1/2010 |
| FR | 1388029 | 2/1965 |
| FR | 2 858 768 | 2/2005 |

OTHER PUBLICATIONS

French Search Report for French Patent Application No. 10 56091.

* cited by examiner

*Primary Examiner* — Mark Ruthkosky
*Assistant Examiner* — Laura C Dettinger

(57) ABSTRACT

This invention relates to a heating article (1) comprising a substrate (2) of which one of the surfaces (21) is equipped with a design (4), in the form of a coating layer with at least one pattern (41, 42), which comprises a thermochromic pigment composition with at least one SC thermochromic pigment that is lipid-sensitive under heat. According to the invention, the thermochromic pigment composition includes at least one thermostable pigment and composite pigment grains (43), which each include a core (430) including the semiconducting thermochromic pigment, and a solid, transparent and continuous envelope (431), formed by a mineral or organomineral material. The thermochromic pigment composition shows a reversible change in color in a thermal color-change area with an amplitude of no more than 40° C. within the range of variation of said temperature $T_1$ of use.

24 Claims, 1 Drawing Sheet

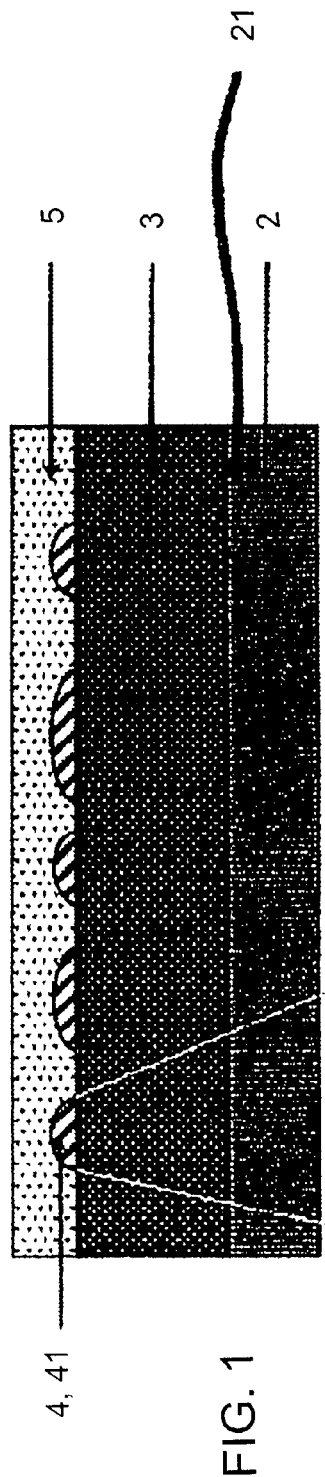
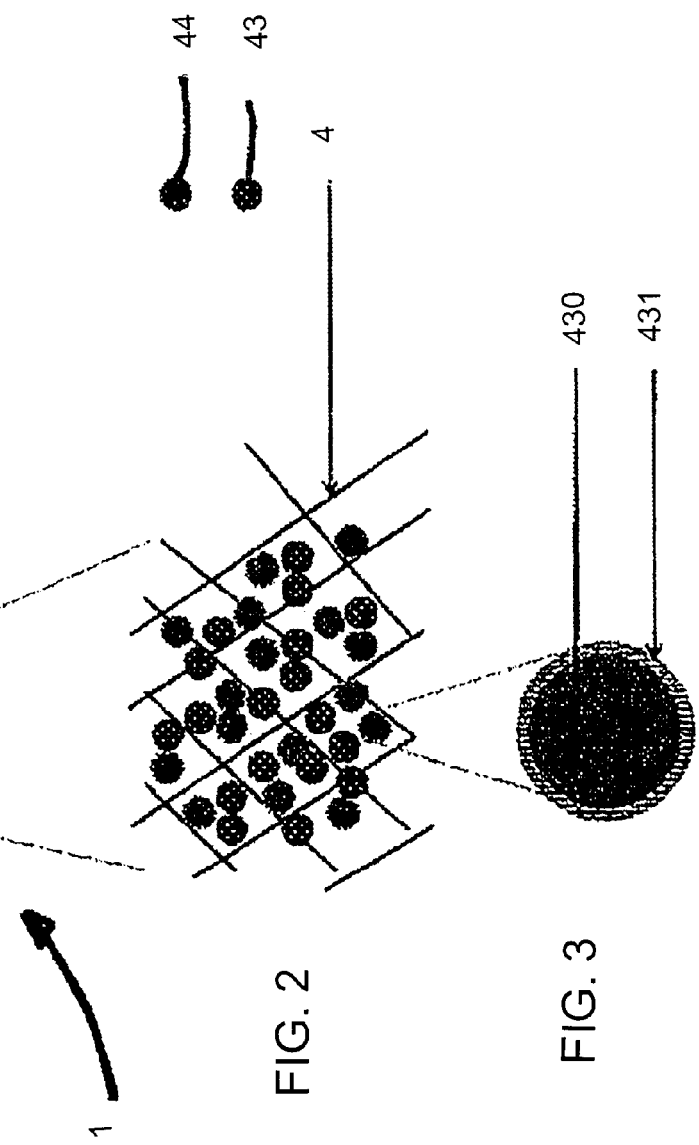
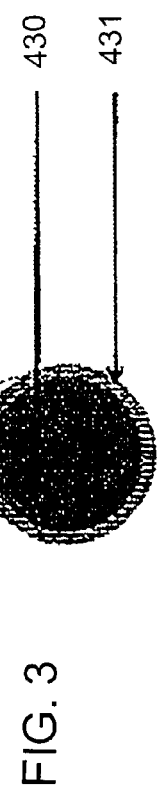
FIG. 1
FIG. 2
FIG. 3

HEATING ARTICLE INCLUDING COLOURED HEAT INDICATOR WITH IMPROVED VISABILITY AND PRECISION

FIELD OF THE INVENTION

This invention relates in general to heating articles comprising a reversible coloured heat indicator with improved visibility and precision. It relates in particular to articles such as skillets, saucepans, or sauté pans, barbecue grills, flat irons, or hair straightening irons.

BACKGROUND OF THE INVENTION

Indeed, it is particularly beneficial for a user of such articles to see the change in temperature of an article during use when the latter is subjected to heating. In the case of a cooking article, good control of temperature while cooking foods is necessary for sanitary and gustatory reasons (for example, for searing a steak on a grill or in a skillet), and for limiting occasional overheating that can weaken the coating of the cooking article. In the case of a hair iron, a thermochromic functional indicator enables the user to know the optimal temperature of use of the hair iron: in this particular case, it concerns the temperature of breakage of the disulfide bonds of the hair. In the case of a flat iron, a thermochromic functional indicator makes it possible to prevent, for example, any risk of burning with the hot base (in particular when the iron reaches its operating temperature and the indicator light of the thermostat turns off).

In this field, cooking containers are already known which comprise temperature indicators enabling the temperature of the internal surface of the containers to be known. These indicators generally include a temperature sensor integrated at the base of the cooking container and connected by conductors to an electrical unit comprising a screen for displaying the temperature measured by the sensor. Owing to such means, the user is constantly informed of the temperature of the cooking surface of the container, so that he or she is capable of detecting the precise moment at which the cooking surface has reached a sufficient temperature in order to successfully "sear" meat. In addition, the fact that the temperature of the cooking surface of the container is displayed also enables the user to be alerted that the article is hot and presents a burn risk to people.

Such temperature indicators nevertheless have the disadvantages of being complicated and presenting problems of electrical insulation, in particular with respect to washing water.

In some other known embodiments of heating articles, the temperature indicator consists of an organic thermochromic substance capable of suddenly changing colour at a certain temperature. It is in particular a micro-encapsulated thermochromic pigments old under the trade name ChromaZone®. This pigment changes from a coloured state to a colourless state when the temperature increases, due to a change in the physical state (change from the solid state to the liquid state of the solvent inside the microcapsule). However, this thermochromic pigment used as a temperature indicator has the disadvantage of not being placed directly on the heating surface of the article. Thus, for example, in the case of a cooking article, the thermochromic pigment is placed n the base of the handle, on an external edge of the article, or on the flat edge, so that the change in colour of the chemical compound is not a real indication of the temperature reached by the cooking surface. As this type of thermochromic compound is not resistant to temperatures above 200° C., it cannot be positioned directly on the cooking surface, of which the temperature reaches at least 200° C. on each use. If this were the case, such a compound would be quickly and irreversibly damaged.

The terms thermochromic substance, mixture or composition refer, in the sense of this invention, to a substance, mixture or composition that reversibly changes colour according to the temperature.

The French patent FR 1 388029 belonging to the applicant is also known, which describes a cooking utensil equipped with a heat indicator consisting of a thermosensitive body reversibly changing colour according to the temperature, in which said heat indicator is formulated in a non-stick coating, in particular consisting of poly-tetrafluoroethylene. A thermostable pigment can also be incorporated in the cooking utensil as an indicator so as to enable the relative change in colour of the thermosensitive indicator, and therefore the change in temperature, to be assessed.

The term thermostable pigment refers, in the sense of this invention, to a mineral or organic compound, which shows a very minor change in tint when it is subjected to a temperature increase within a given temperature range.

However, the simple association of a thermostable pigment and a thermosensitive pigment does not make it possible to clearly distinguish the change in temperature.

To overcome these problems, the applicant has developed a heating article comprising a surface covered by a base coating consisting of thermostable resin, which is resistant at least at 200° C. and on which a design based on a thermostable resin is applied, which is resistant at least at 200° C. This design includes at least two patterns, one containing a thermochromic chemical compound that darkens as the temperature increases, and the other containing a chemical compound that is also thermochromic, but that becomes lighter as the temperature increases. This article is the subject of the European patent EP 1121576.

The simultaneous use of these thermochromic chemical compounds in contiguous areas actually makes it possible to improve the visual perception of the change in temperature of the cooking surface of the heating article. However, this perception can be difficult: on the one hand because the two reds have chromatic values that are similar at room temperature, and on the other hand because the colour confusion occurs in an area with a heat amplitude of at least 50° C. Thus, the precision of the measurement and the ease of reading are not easy, in particular for people without special training. Therefore, the users have a tendency to overlook the information provided by this indicator.

The fact remains that good monitoring of the temperature during cooking of foods is necessary for sanitary and gustatory reasons, and to limit occasional overheating, which can weaken the coating of the cooking article.

In addition, semiconductors (SC) are also known, of which the properties make it possible to envisage a progressive change in colour as the temperature increases, according to the sequence white→yellow→orange→red→black.

The term thermochromic semiconductor (SC) in the sense of this invention refers to a semiconducting compound that shows a change in colour as the temperature increases. The progressive and fully reversible thermochromic character of these semiconducting compounds is associated with the decrease in the width of the forbidden band of the semiconductor due to the dilation of the material.

In the fields of application envisaged for this invention, a heating article of the cooking article or iron type is typically used in a range of temperatures between 100° C. and 300° C. However, in this temperature range, the changes in colour of the SCs remain limited and indistinct and are limited to the following changes: from pale yellow to bright yellow ($Bi_2O_2$), from yellow-orange to red-orange ($V_2O_5$), from red-orange to very dark red ($Fe_2O_3$), and so on. It can thus be seen that, even if it is possible to obtain the different colours of red, the perception of the thermochromic effect remains difficult and imprecise.

To overcome these problems of perception of the thermochromic effect of the semiconductors, in particular in temperature ranges (between 100° C. and 300° C.) that are typically the temperature ranges of use of heating articles such as cooking articles or irons, it is known to combine one or more thermochromic SCs with one or more thermostable SCs.

The main effect of this combination of thermochromic semiconductors and thermostable semiconductors is that the range of tints obtainable is thus particularly broad. But in addition, the perception of the change in tint is also increased: the mixture of a thermochromic semiconductor that will change from off-white to bright yellow can then, if it is associated with a blue pigment, change from cyan-blue to citron-green. As the maximum sensitivity of the human eye is centred on wavelengths corresponding to green, this mixture will not necessarily show more colorimetric parameter changes than the thermochromic pigment alone, but the human eye will perceive this change better.

The European patent EP 0 287 336 and the European patent EP 1 405 890 disclose the development of mixtures consisting of one or more thermochromic semiconductors and one or more stable pigments in order to obtain complex compositions with enhanced thermochromic properties. More specifically, in the patent EP 1 405 890, bismuth oxide $Bi_2O_3$ (thermochromic) is combined with $CoAl_2O_4$ (thermostable, blue), in a ratio of 15:1, with the pigments being bound by a potassium silicate. The coating containing this mixture is blue at room temperature and becomes orange at 400° C.

Admittedly, these mixtures of thermochromic semiconductors with thermostable pigments have the advantage of conferring on the coatings containing them a reversible thermochromism with improved visibility and precision.

However, certain thermochromic semiconducting pigments have the major disadvantage of not being compatible, during use on a heated surface, with oils or grease: they are said to be lipid-sensitive. Indeed, for example, the semiconducting metal oxides are easily reducible under heat in the presence of oil or grease and the compounds formed after this reduction reaction are no longer thermochromic.

It is therefore necessary to protect the thermochromic semiconductors that are lipid-sensitive under heat, so as to make them inert to an oil or a grease capable of reducing the thermochromic SCs.

It is known to a person skilled in the art, specialized in pigment-based compositions, to protect pigments by coating them with a mineral shell (or envelope). Such a technique is commonly used in numerous fields, such as, for example, cosmetics or paints. Thus, the French patent FR 2 858 768 describes a hair care formulation, comprising, as pigments, metallic particles coated with an oxide shell (silver particles coated with $SiO_2$). These pigments make the hair shiny for a long period of time. In paints, the photocatalytic effect of the titanium oxide is decreased by coating by means of a silica mineral shell and the acid resistance of the ultramarine blue pigments is improved (artificial mineral pigments obtained by heating soda, clay and sulphur).

Finally, also in this field, it is possible to create pigments with an effect (metallic, pearled, and so on.) with an improved durability, by coating with a mineral shell based on silica, cerium oxide or iron, for example.

In addition, it is also known to a person skilled in the art that the protections provided by a silica-based coating to commercial yellow pigments based on mixed bismuth and vanadium oxide $BiVO_4$ (in particular, the pigments sold under the trade names Sicopal Yellow K1160FG® of BASF, Lysopac Jaune 6613P® of CAPPELLE, and Vanadur Plus 9010® of HEUBACH, etc.) enable better colour stability under temperature and make it possible to use them in extruded plastics. The processes for producing these protected pigments are described in U.S. Pat. No. 4,063,956 of the Du Pont company, U.S. Pat. No. 4,851,049 of the BASF company, U.S. Pat. No. 5,851,587 of the Bayer AG company, and EP 1086994 of the Cappelle company. The coatings of the pigments, which re dense and continuous coatings containing in particular silica, are deposited by precipitation. Indeed, the yellow pigments inside the coating have a thermochromic character ranging from bright yellow at room temperature to red-orange at 300° C., but they cannot be used in a mixture combining a thermochromic pigment with a thermostable pigment because their colour is so bright and intense that it neutralizes the colour of any other added pigment.

Finally, the American U.S. Pat. No. 2,285,366 describes different synthetic pathways of an impenetrable silica shell around particles of all sorts of compositions. The coating can be done by silicic acid ("active silica") condensation from soda silicate by precipitation, or from methyl-orthosilicate (or TMOS) by sol-gel, or from hydrolyzed $SiCl_4$. These techniques of coating by precipitation or by sol-gel are still widely used because they enable shells (or envelopes) of a very wide variety to be created: metal oxides (of metals Al, Si, Ti, B, Mg, Sn, Mn, Hf, Th, Nb, Ta, Zn, Mo, Ba, Sr, Ni, Sb), and phosphate or pyrophosphate of Zn, Al, Mg, Ca, Bi, Fe, Cr and so on.

However, there is no mention in any of these documents of transparent protection, with specific characteristics to thermally resist temperatures that may be very high in the presence of oil or grease.

BRIEF DESCRIPTION OF THE FIGURES

The invention can be better understood by references to the detailed description when considered in connection with the accompanying Figures.

FIG. 1 is a transverse cross-section view of a first example of a cooking container according to the invention, of which the internal surface is equipped with a thermochromic design.

FIG. 2 diagrammatically shows the distribution of the composite and thermostable pigments inside the design covering the internal surface of the cooking container shown in FIG. 1.

FIG. 3 diagrammatically shows a composite pigment with a core-envelope structure, present in the design shown in FIGS. 1 and 2.

DETAILED DESCRIPTION OF THE INVENTION

While the present disclosure can be embodied in many different forms, the drawings and discussions are presented with the understanding that the present disclosure is an exemplification of the principles of one or more inventions and is not intended to limit any one of the inventions to the embodiments illustrated.

To properly perform its role in the intended applications, in particular as a temperature indicator arranged on the surface of heating articles intended to be heated (for example cooking articles), the applicant discovered that the thermochromic semiconducting pigments that are lipid-sensitive under heat must be protected by an envelope, and that is must be transparent and continuous with a thickness of at least 5 nm to make the coated pigment impervious to the oil up to a temperature of at least 450° C. In addition, the particle size of the thermochromic pigments thus coated will have to be fine enough to be easily dispersed in a formulation and enable a good covering power of the coating obtained.

The term heating article in this invention refers to an article that has its own heating system, or which is heated by an external system and which is capable of transmitting the calorific energy provided by this system to a third material or object in contact with said article.

The term covering power in this invention refers to the ability of a coating to mask any change in colour or tint of the surface of the substrate on which said coating is applied, with the lowest possible thickness.

All of these constraints make the protection step fairly delicate and require in particular an initial activation of the surface of the particles (which can be either a heat treatment or a milling step, or both), having a small enough size, a controlled thickness and homogeneity, as well as sufficient densification of the envelope.

The invention therefore consists of implementing this protection effectively on a thermochromic semiconducting pigment that is lipid-sensitive under heat, so as to make them inert to an oil at high temperature (i.e. to prevent a reduction of said semiconductors by the oil). In the case of a powdered pigment, it is also necessary to ensure that a sufficiently fine particle size is preserved, so as to ensure good colorimetric coverage of the coating in which said pigments are formulated.

More specifically, this invention relates to a heating article comprising:
  a substrate having a surface intended to be heated in a temperature range $T_1$ of use of between 50° C. and 400° C., and
  a design applied to at least a portion of said surface, in which said design is in the form of a coating layer with at least one pattern, which comprises a thermochromic pigment composition with at least one thermochromic semiconducting pigment that is lipid-sensitive under heat.

According to the invention, the thermochromic pigment composition includes:
  at least one thermostable pigment, and
  composite pigment grains with a core-envelope (commonly called "core-shell") structure, the diameter of which is between 20 nm and 25000 nm and each of which includes:
    a core including the thermochromic semiconducting pigment that is lipid-sensitive under heat,
    a solid, transparent and continuous envelope, which consists of a mineral material or an organomineral hybrid material, and
  this thermochromic pigment composition shows a reversible change in colour in a thermal colour-change area with an amplitude of no more than 40° C. within the range of change in the temperature of use $T_1$.

The composite pigment grains according to the invention have the property of being inert to an oil up to a temperature on the order of 450° C., and more specifically oils of the triglyceride fatty acid type of plant, animal or synthetic origin, and, by extension, to fatty acid esters (mono, di or pluri fatty acid esters with alkyl groups of which at least one is Cn with n being equal to or greater than 8.

The thermochromic semiconducting pigment that is lipid-sensitive under heat can be in liquid form or in solid form. Preferably, the thermochromic semiconducting pigment that is lipid-sensitive under heat is in divided state in the form of solid particles, with each composite pigment grain including at least one pigment particle.

The thermochromic pigment composition can also include one or more uncoated thermochromic pigments if not lipid-sensitive under heat.

Advantageously, the envelope of the composite pigment grains has a thickness of between 5 nm and 100 nm. Indeed, below 5 nm, the thickness of the envelope does not make it possible to cover all of the surface irregularities of the pigment particles. Beyond 100 nm, it is too thick and risks reducing the colorimetric intensity of the thermochromic pigment.

Preferably, the envelope of the composite grains is between 20 and 50 nm, and, better yet, on the order of 30 nm: the best results are obtained with these preferential values in terms of resistance to the oil under heat.

The heating article according to the invention has the major advantage of being thus equipped with a reversible coloured heat indicator with improved visibility and precision, while being particularly resistant to high temperatures. Indeed, in the heating article according to the invention, the temperature indicator is therefore constituted by the design layer incorporating the composite pigment particles with a core-envelope structure based on inorganic pigments in the core and a mineral or organomineral hybrid envelope. The composite pigment grains are clearly more temperature-resistant than the thermochromic compounds that they contain in their core.

The envelope of the composite grains can be mineral or organomineral. It is typically synthesized by sol-gel from at least one metal polyalkoxylate.

This envelope is preferably mineral. For example, it can advantageously be constituted by one or more metal oxides chosen from the oxides of the following elements: Al, Si, Ti, B, Mg, Fe, Zr, Ce, Sn, Mn, Hf, Th, Nb, Ta, Zn, Mo, Ba, Sr, Ni, Sb. The mineral envelope of a composite particle can also be chosen from the phosphates or pyrophosphates of the following elements: Zn, Al, Mg, Ca, Bi, Fe, Cr, and so on.

Preferably, the core of the composite pigment grains includes, in addition to the thermochromic pigment, at least one thermostable pigment in liquid form or in the divided state in the form of solid particles.

Moreover, the design may cover only a small surface of the surface intended to be heated, but it can also cover the entirety thereof. The design can be non-continuous or continuous (flat).

The design can be applied directly on the surface of the substrate intended to be heated (and of which the user seeks to estimate the temperature during use). Indeed, the protection of thermochromic semiconducting pigments that are lipid-sensitive under heat with a transparent and continuous shell (or envelope) with a suitable thickness makes it possible to render them inert to oils or grease, and in particular when they are heated to temperatures on the order of 300° C.-450° C., without premature aging of the indicator being observed.

However, it may be advantageous for the surface intended to be heated to be covered at least partially by a continuous or non-continuous base coating, on which the design layer is at least partially applied, in which the base coating includes at least one thermostable binder that is resistant at least at 200° C.

Moreover, the design layer, as well as the surface of the substrate intended to be heated and/or the base coating as the case may be can advantageously be covered with a continuous layer of a continuous and transparent finishing layer, which includes at least one thermostable binder resistant at least at 200° C. This finishing layer gives the user perfect visibility of the design while protecting it from abrasion, and while conferring non-stick properties on it, as the case may be (finishing coating based on fluorocarbon resin, for example).

Advantageously, if the heating article according to the invention comprises three sequential layers covering the surface of the substrate intended to be heated, the thermostable binder of the finishing layer and that of the base coating layer are identical. Preferably, the base coating, the design and the finishing layer are baked simultaneously, which enables simultaneous sintering of the thermostable binders of each layer and thus promotes the cohesion of the composite particles of the design with one another.

According to a first particularly advantageous embodiment of this invention, the design can include, in addition to the composite pigments, a binder that is thermostable at least at 300° C., which can advantageously be chosen from among the fluorocarbon resins, alone or in a mixture with other fluorocarbon resins, polyester-silicone resins and silicone resins, and sol-gel materials.

In this first embodiment with, as the binder, a sol-gel material, said sol-gel material can advantageously include a matrix of at least one metal polyalkoxylate and at least 5% by weight with respect to the total weight of the coating of at least one colloidal metal oxide dispersed in said matrix.

In this case, with such a binder, the envelope of the composite particles is preferably a silica envelope, which forms a barrier insulating the pigment from the potential action of an oil or a grease under heat. This envelope can be produced as follows (according to the method of the invention described in greater detail below): after activation of the surface of the pigment and milling so as to obtain a satisfactory particle size, a silica envelope (or shell) is formed by sol-gel from alkoxysilane precursors under basic conditions. This envelope is then densified by a heat treatment so as to make it totally impermeable to grease.

In this first embodiment, it is also possible to use, as the thermostable binder, a fluorocarbon resin or a mixture of fluorocarbon resins, alone or in a mixture with other thermostable resins.

This fluorocarbon resin can be polytetrafluoroethylene (PTFE), tetrafluoroethylene and perfluoropropylvinylether (PFA) copolymer or tetrafluoroethylene and hexafluoropropylene (FEP) copolymer or a mixture of said fluorocarbon resins.

The other thermostable resins resistant to at least 200° C. can be a polyamide imide (PAI), a polyethylene sulfone (PES), a polyphenylene sulphide (PPS), a polyetherketone (PEK), a polyetheretherketone (PPEK) or a silicone.

Finally, still in this first embodiment (with a thermostable binder), it is possible to use, as the thermostable binder, a silicone resin or a polyester-silicone resin.

In this first embodiment (design layer with a thermostable binder) and if the heating article according to the invention comprises at least two sequential layers covering the surface of the substrate intended to be heated in particular (a base coating covered with a design, the design covered with the finishing layer, or the base coating covered with the design, itself covered with a finishing layer), it is necessary for these different layers (therefore their respective thermostable binders) to be compatible with one another. However, it is not essential for the binders to be identical. It is thus possible to have a silicone resin-type binder in the design layer, whereas the binder of the base coating and/or the finishing layer is a sol-gel material.

According to a second particularly advantageous embodiment of this invention, the design is free of a thermostable binder.

For certain types of applications, the addition of formulation additives may be necessary to adapt the properties of the composition to the application process. Thus, for serigraphy or tampography applications, the presence of at least one thickener is necessary in the composition of design layer, and this thickener can be organic (urethane base, acrylic base, cellulose base, etc.) or inorganic (pyrogenic silica, Laponite®, etc.).

Other modes of application of the design are also possible, for example by spraying, curtain, roller, quenching, painting, and so on.

With regard more specifically to the composite pigment grains with a core-envelope structure, semiconducting metal oxides are used as thermochromic pigments constituting the core, and which are preferably chosen from among the following semiconductors:

$V_2O_5$, which has, at room temperature, an orange-yellow colour, $Bi_2O_3$, which has, at room temperature, an off-white, very slightly yellow colour, $BiVO_4$, which is yellow at room temperature, $WO_3$, $CeO_2$, $In_2O_3$ very similar to $Bi_2O_3$, and $Fe_2O_3$, which may be orange to brown at room temperature, and pyrochloric $Y_{1.84}Ca_{0.16}Ti_{1.84}V_{0.16}O_{1.84}$ SC which is orange-yellow at room temperature.

The thermochromic pigment composition of the design includes, in addition to the composite pigment grains, at least one thermostable pigment.

With respect to a temperature indicator constituted by a thermochromic pigment used alone as described in patent EP 1121576, the use of thermostable pigments associated with composite pigment grains makes it possible to obtain a particularly broad range of tints and increase the perception of said change in tint. The temperature indicator of the heating article according to the invention is then more visible (in the sense of being perceptible by a user during use), more readable (i.e. easier to understand by the consumer) and more precise than that described in patent EP 1121576.

Thus, for example, the thermochromic pigment composition can include a mixture of at least one thermostable pigment and at least one composite pigment particle coating a thermochromic pigment, in which said mixture can advantageously be chosen from the following mixtures:

coated $Bi_2O_3 + Co_3(PO_4)_2$,
coated $Bi_2O_3 + LiCoPO_4$,
coated $Bi_2O_3 + CoAl_2O_4$, and
coated $V_2O_5 + Cr_2O_3$.
coated $YCaTiVO + Co_3(PO_4)_2$ The weight ratios between the respective amounts of thermochromic coated pigments (i.e. in fact the composite pigment particles of which the core includes the thermochromic pigment and thermostable pigment indicated above, with the change in colour and the final colour:

mixture of coated $Bi_2O_3$ (pale yellow at room temperature) and $Co_3(PO_4)_2$ (thermostable violet), with a weight ratio of $Bi_2O_3$ to $Co_3(PO_4)_2$ of 3:1; this mixture is mauve at room temperature, then becomes green at 200° C.;

mixture of coated $Bi_2O_3$ (pale yellow at room temperature) and $LiCoPO_4$ (thermostable violet), with a weight ratio of $Bi_2O_3$ to $LiCoPO_4$ of 1:3; this mixture is violet at room temperature, then becomes grey at 200° C.;

mixture of $Bi_2O_3$ (pale yellow at room temperature) et de $CoAl_2O_4$ (thermostable blue), with a weight ratio of $Bi_2O_3$ to $CoAl_2O_4$ of 30:1; this mixture is blue at room temperature, then becomes green at 200° C.;

mixture of $V_2O_5$ (yellow-orange at room temperature) et de $Cr_2O_3$ (thermostable green), with a weight ratio of $V_2O_5$ to $Cr_2O_3$ de 1:1; this mixture is green at room temperature, then becomes brown at 200° C.

mixture of coated $Y_{1.84}Ca_{0.16}Ti_{1.84}V_{0.16}O_{1.84}$ (yellow-orange at room temperature) and $Co_3(PO_4)_2$ (thermostable violet), with a weight ratio of $Y_{1.84}Ca_{0.16}Ti_{1.84}V_{0.16}O_{1.84}$ to $Co_3(PO_4)_2$ of 1:4; this mixture is green at room temperature, then becomes grey at 200° C.

According to a particularly advantageous embodiment of this invention, the heating article can comprise at least two patterns each comprising a pigment composition, in which at least one of the pigment compositions of the patterns is thermochromic. Preferably, the identical thermochromic pigment composition patterns are arranged so that it is possible to find at least one transverse cross-section according to which they are separate. By contrast, from a top view, these patterns can be connected to one another or also be separate.

According to a first alternative of this embodiment, these patterns have:
  at room temperature, an initial colorimetric difference perceptible at room temperature by the human eye, and
  at temperature $T_1$ of use of the heating article, which is between 60° C. and 350° C. (and more specifically generally between 200° C. and 300° C. for a cooking article), a final colour that is substantially identical.

For example, a possible combination is the following:
one of the patterns of the heating article includes the mixture of coated $Bi_2O_3$ (pale yellow at room temperature) and $LiCoPO_4$ (thermostable violet), with a weight ratio of $Bi_2O_3$ to $LiCoPO_4$ of 1:3; this mixture is violet at room temperature, then becomes grey at 200° C.;
whereas the other pattern includes the mixture of coated $Y_{1.84}Ca_{0.16}Ti_{1.84}V_{0.16}O_{1.84}$ (yellow-orange at room temperature) and $Co_3(PO_4)_2$ (thermostable violet), with a weight ratio of $Y_{1.84}Ca_{0.16}Ti_{1.84}V_{0.16}O_{1.84}$ to $Co_3(PO_4)_2$ of 1:4; this mixture is green at room temperature, then becomes grey at 200° C.

According to another embodiment of this invention, the reverse can also be envisaged: at room temperature, the two patterns have an identical colour (for example with one of the being thermochromic and the other being thermostable or both patterns being thermochromic). As the temperature of the article rises, the appearance of a colorimetric difference between the two patterns is observed (which constitutes the indication of the rise in temperature).

According to a second alternative of this embodiment, one of the patterns comprises a pigment composition showing a reversible change in colour around the temperature of use $T_1$, while the other pattern comprises a pigment composition showing a reversible change in colour a temperature $T_2$ greater than temperature $T_1$ of use of at least 40° C. According to this second alternative embodiment, the heating article comprises multiple temperature indicators.

Indeed, it is particularly beneficial for a consumer to be alerted when a heating element has reached its optimal temperature of use:
  for a cooking article, the optimal cooking temperature is different according to the foods (fish, vegetables, red meat, white meat),
  in the field of application of irons, this temperature is different according to the textile to be ironed.

It is also useful for the consumer to be alerted when a maximum temperature is reached. In this case, it can be a maximum temperature for the preservation of the object treated (nutrients in the case of cooking articles, textile fibre for irons, etc.) or for the preservation of the coating of the tool. The danger warning is also particularly useful (prevention of burn risk, etc.).

Thus, in the case of a heating article of the cooking article type in which the design has two patterns, it can be considered that the later is equipped with at least two temperature indicators distributed as follows:
  the pigment composition of one of the patterns, which shows a reversible change in colour around the temperature of use $T_1$, constitutes a so-called "low-temperature" indicator intended to alert the consumer when the surface of the substrate intended to be heated has reached an optimal temperature of use, while
  the pigment composition of the other pattern, which shows a reversible change in colour at around a temperature $T_2$ of the beginning of degradation of the heating article, constitutes a "high-temperature" indicator intended to alert the user of a possible degradation of the object treated (nutrients in the case of cooking articles, textile fibre for irons, etc.) and of the need to adjust the heating of the article.

With regard to the nature of the substrate with the surface intended to be heated, it can be made of a material chosen from among metals, wood, glass, ceramics or plastics.

Preferably, in the context of this invention, metal substrates are used, and in particular aluminium, stainless steel, cast iron, iron or copper.

For better adhesion of the coating (i.e. the design layer directly applied to this surface, or, as the case may be, a base coating layer) on the surface of the substrate intended to be heated, the latter can advantageously be treated so as to increase its specific surface:
  for aluminium, this treatment can be performed by anodization (creation of a tubular alumina structure), by chemical attack or by sanding, by supplying material continuously or non-continuously according to a hot spray technique (plasma, flame or arc spray),
  the other metallic substrates can also be polished, sanded, brushed or microbeaded, or be subjected to a supply of material as described above.

As examples of heating articles according to the invention, it is possible in particular to cite the cooking articles, barbecue grills, electrical cooking appliances (crêpe pans, waffle irons, table grills, raclette grills, fondue pots, rice cookers, jam pots, bread machine vats, and so on), irons, hair straightening irons, and so on.

The composite pigment grains with a core-envelope structure according to the invention can be produced by a process comprising the following steps:
  a step of providing a thermochromic semiconducting pigment particle powder, in particular $Bi_2O_3$;
  a step of at least partially activating the surface of said thermochromic semiconducting pigment particles;
  a step of mixing at least one metal polyalkoxylate with an alcohol in order to initiate a hydrolysis-condensation phase of said silica precursor, which is continued under agitation for several hours, in order to obtain the composite pigment grain formation (43);
  a filtering step in order to recover said particles (430) and separate them from the reagents and solvents that have not reacted; and
  a step of densification of the envelope of said particles at a temperature of between 200° C. and 600° C. for at least 10 minutes.

The activation step can be either a heat treatment, a milling treatment or both simultaneously (according to the initial size of the pigment particles).

Preferably, the metal polyalkoxylate is a TEOS and the alcohol used for the hydrolysis-condensation is isopropanol.

The various steps of the process according to the invention are described in detail in example 2.

The composite pigment grains obtained by the process according to the invention have a core-envelope structure with a core containing a thermochromic SC (typically $Bi_2O_3$) and a silica envelope. This envelope is continuous, impervious to oil, transparent, heat resistant at least at 450° C., compatible with the formulation in which the particles will be incorporated, and the final particle size of the powder enables good dispersion in formulation and good colorimetric coverage of the coating obtained.

Other particular features and advantages of the invention will become clear in the examples and the embodiment (represented by the single FIG. 1 below).

The invention is presented in greater detail in the following examples. In the examples, unless otherwise indicated, all of the percentages and parts are expressed in terms of weight.

EXAMPLES

Pigments
  Thermostable pigments:
    $Co_3(PO_4)_2$ (violet at room temperature), sold by the FERRO company under the trade name PK5033
  Thermochromic pigment:
    $Bi_2O_3$ (which is off-white, slightly yellow-tinted at room temperature), in powdered form, sold by the Fluka company under the name "Bismuth oxide (III)"
  Silica envelope:
    obtained by sol-gel from TEOS as a precursor.
Base and Finishing Coating Layers
  PART A:
    colloidal silica in the form of an aqueous solution with 30% silica, sold by the Clariant company under the trade name Klebosol,
    isopropanol,
    black food-grade pigments sold by the FERRO company under the trade name FA1220 of Ferro.
  PART B:
    sol-gel polymerization precursor: methyltrimethoxysilane (MTMS) or MTES;
    organic acid: acetic acid;
Design Layer
  thickener: methacrylic acid and acrylic ester copolymer
  solvent: propylene glycol.
Method for Verification of the Thermochromism of the Heating Article and Oil Test
  To macroscopically evaluate the quality of the composite particle envelope, two types of observation are performed:
    verification of the preservation of colorimetric and thermochromic properties of the composite particles: this verification is based on the comparison at room temperature and after a heating at between 100° C. and 300° C. of the colour of the raw powder (i.e. an uncoated pigment powder) and of the protected powder; the colour differences should be minimal,
    oil test of the composite particle powder: this test consists of evaluating the efficacy of the protection provided to the raw pigments (i.e. uncoated) by simulating the conditions of use of a cooking article, by cooking with grease). For this, the following steps are performed:
      the powder is immersed in oil and heated at 200° C. for 9 hours, or heated at 270° C. for 2 hours for an accelerated test;
      after filtration and cleaning of said powder, the colour of the powder and its thermochromism are verified; the change in thermochromism (between the protected powder and an unprotected powder) should be minimal.

Example 1

Production of a Cooking Article According to the Invention

A cooking container according to the invention is produced as described below, in reference to the appended figures provided as non-limiting examples:

The cooking container shown in FIG. 1 consists of a frying pan (or skillet) 1 comprising a substrate 2 with an internal surface 21 intended to be heated and to receive foods for cooking.

This internal surface 21 is covered by a continuous base coating layer 3.

A non-continuous design 4 including a plurality of patterns 41, 42 is applied to at least a portion of the base coating 3, which includes, as a thermostable binder resistant to at least 200° C., a sol-gel material obtained according to the embodiment described in example 5.

The composition of the design includes the pigment paste of example 4, based on thermochromic composite pigments 43 and thermostable pigments 44.

The composite pigments 43 are pigment grains with a core-envelope structure, as shown in FIG. 3: the core 430 includes the thermochromic SC(s) and the envelope 431 is made of a mineral or organomineral hybrid material.

The distribution of the thermochromic composite pigments 43 and thermostable pigments 44 in a pattern 41 of the design 4 is shown in FIG. 2.

The design 4 can be applied by serigraphy according to the process described in French patent 2 576 253 or by tampography, or by any other means (spray, curtain, roller, quenching, etc.).

After application of the design 4, a continuous and transparent finishing layer is applied, which entirely covers the design 4 and the base coating layer 3, according to the embodiment described in example 5, and which is subjected to baking, which can be performed successively after that of the base coating 3. However, it is preferable for the bakings of the coating 3 and the design 4 to be performed in a single simultaneous baking operation.

Example 2

Production of the Thermochromic Pigment $Bi_2O_3$ in a Silica Envelope

After activation of the surface of the thermochromic SC pigment ($Bi_2O_3$) and milling to obtain a satisfactory particle size, a silica shell is formed by sol-gel from alkoxysilane precursors under basic conditions. This shell is then densified by a heat treatment so as to make it totally impermeable to grease. The procedure for synthesis of the shell is described below:
Activation
  First, the thermochromic pigment in powder form is activated by heating of the powder at 430° C.
Milling
  The composite particle sizes must be fine enough to be easily dispersed in a formulation and enable good colorimetric coverage of the coating obtained.

However, given that, after the encapsulation, the coated $Bi_2O_3$ powder can no longer be milled so as not to risk breaking the protection envelope just formed, it is necessary to obtain, before the synthesis of the envelope, an adapted particle size of the $Bi_2O_3$ powder. For this, the particle size analysis (established with a laser diffraction granulometer, for example) of the uncoated and milled $Bi_2O_3$ powder must show that the powder has a median diameter of less than 5 μm.

Thus, the procedure is as follows: the pre-activated powder is very quickly introduced into a Discontimill ball mill with isopropanol, with a ratio of 70 g of powder to 30 g of solvent. The grinding lasts 2 hours 30 minutes.

Initiation

This step corresponds to the initiation of the hydrolysis-condensation of the silica precursors, which is performed as follows:

1. tetraethylorthosilicate (TEOS) is first added, under agitation, to the milled $Bi_2O_3$ dispersion in isopropanol; the amount of TEOS is defined as follows: for 100 g of milled $Bi_2O_3$ powder with a specific area of 0.14 m2/g (which corresponds to particles with a radius of 2.5 μm), it is necessary to add 2.4 g of TEOS to the dispersion in order to obtain an envelope with a thickness of around 30 nm;
2. the hydrolysis of the silane is initiated by adding water, of which the pH has been adjusted to 11 by adding ammoniac, slowly and under agitation, to the dispersion. The water is added in reasonable stoichiometric excess with respect to the amount of silane (stoichiometric ratio R of around 3).

Maturation

The hydrolysis-condensation of the TEOS is continued under agitation, at room temperature for several hours.

Filtration

Coated silica particles (not yet completely densified) are then extracted by filtration of the synthesis solvent and reagents not having reacted.

Densification

To make the silica shell formed as impervious as possible, a final heat densification step is performed.

A densification at 500 C for 30 minutes makes it possible to obtain an effective protection with respect to oils or greases at very high temperature. Shorter durations or lower densification temperatures are insufficient to effectively cross-link and densify the silica network. By contrast, excessive durations and temperatures impair the efficacy of the protection.

Example 3

Production of a Base Layer 3 on the Internal Cooking Surface 21 of the Cooking Article According to the Invention of Example 1

A sol-gel composition is prepared in the form of a bi-component including a part A and a part B:
part A includes a dispersion of colloidal silica, water to enable hydrolysis of the metal precursors of part B, isopropanol to enable good accounting for parts A and B and black food-grade pigments,
part B comprises, as the sol-gel precursor, methyltriethoxysilane, which enables the formation of the matrix of the coating while rejecting only the ethanol (which is a non-toxic volatile organic compound (VOC), unlike methyltrimethoxysilane, which leads to the formation of methanol, a toxic VOC), as well as acetic acid, enabling the sol-gel reaction to be catalyzed.

These two parts A and B can be preserved for more than 6 months in this separated form.

Before the application on the internal surface of the cooking article as shown in FIG. 1, parts A and B are combined in a mixer to create an intimate mixture and enable the hydrolysis reaction to be initiated. It is then necessary to allow this mixture to mature for at least 24 hours before the actual application, so as to allow the hydrolysis and condensation reactions to progress sufficiently. The pot-life of the mixture is at least 72 hours.

Then, the mixture is filtered on a stainless steel grill having orifices with a diameter of 40 microns, before being applied, with a pneumatic gun, on the internal surface of a preformed aluminium dish, which has previously been at least de-greased and de-dusted. To promote adhesion of the coating, the internal surface of the substrate has previously been treated (for example by sanding) so as to increase its specific surface.

The base coating 3 is then applied in at least one layer with a thickness of 5 to 50 microns. In the case of a multilayer application, each layer is dried before the application of the next.

Example 4

Production of a Design Layer 4 on the Base Coating Layer 3 Produced in Example 3

A pigment paste is first prepared by dispersing 37.5 g of coated $Bi_2O_3$ and 12.5 g of $CO_3(PO_4)_2$ in 50 g of water.

The design composition is comprised of this pigment paste diluted with water and a mixture of heavier solvents such as propylene glycol, ethylene glycol in order to control the drying of the formula. This dispersion is then thickened sufficiently by means of an anionic polyelectrolyte (methacrylic acid and acrylic ester copolymer) in order to have a rheology suitable for application by tampography.

The design composition thus thickened is applied non-continuously in the form of patterns (separate in a transverse cross-section but capable of being connected from a top view): in at least one layer 4. In the case of a multilayer application, each layer is dried before the next is applied.

Example 5

Production of the Finishing Layer on the Design Layer Produced in Example 3 and Baking A finishing layer 5 is produced in the same way as the sol-gel coating layer 3, with the only difference being that it 5 must remain transparent and not therefore include pigments (optionally colourless flakes).

The formulation of parts A and B, the procedure and the application are identical to those described in example 3.

The methyl groups of the matrix of the methyltriethoxysilane-based coating confer non-stick properties on said layer 5. These properties can be improved by the addition of silicone oil in the finishing layer 5, as described in the European patent application EP 2 139 964.

Once all of the layers have been applied and have dried, the article 1 is baked at 250° C. for 15 minutes.

Of course, the invention is not limited to the examples described above (primarily cooking articles) and it is possible to envisage other types of heating articles (for example flat irons, barbecue grill plates, and so on) without going beyond the scope of the invention.

While various embodiments of the present invention have been described above, it should be understood that such disclosures have been presented by way of example only, and are not limiting. Thus, the breadth and scope of the present invention should not be limited by any of the above-described exemplary embodiments, but should be defined only in accordance with the following claims and their equivalents.

Having now fully described the invention, it will be understood by those of ordinary skill in the art that the same can be performed within a wide and equivalent range of conditions, formulations and other parameters without affecting the scope of the invention or any embodiment thereof. All patents, patent applications, and publications cited herein are fully incorporated by reference in their entirety.

The invention claimed is:

1. A heating article comprising
a substrate heatable to a temperature range of between 50° C. and 400° C. ($T_1$) and having a surface; and
a design applied to at least a portion of said surface, wherein the design is in the form of a coating layer having at least one pattern, wherein the at least one pattern comprises
a thermochromic pigment composition including at least one thermochromic semiconducting pigment that is lipid-sensitive under heat, wherein said thermochromic pigment composition includes:
composite pigment grains having a core-envelope structure with a diameter of between 20 nm and 25,000 nm and each of which include:
a core including said thermochromic semiconducting pigment; and
a solid, transparent and continuous envelope formed from a mineral or organomineral hybrid material, and at least one thermostable pigment, wherein thermochromic pigment composition of the heating article shows a reversible change in color in a thermal color-change area with an amplitude of no more than 40° C. within the range of variation of said temperature $T_1$.

2. The heating article according to claim 1, wherein said thermochromic semiconducting pigment is in a divided state in the form of solid particles and wherein each composite pigment includes at least one pigment particle.

3. The heating article according to claim 1, wherein the envelope of the composite pigment grains has a thickness of between 5 nm and 100 nm.

4. The heating article according to claim 3, wherein the envelope of the composite pigment grains has a thickness of between 20 and 50 nm.

5. The heating article of claim 4, wherein the envelop of the composite pigment grains has a thickness of about 30 nm.

6. The heating article according to claim 1, wherein that the envelope of the composite pigment gains is a mineral envelope comprising one or more metal oxides chosen from the oxides of the elements selected from the group consisting of Al, Si, Fe, Zr, Ce, Ti, B, Mg, Sn, Mn, Hf, Th, Nb, Ta, Zn, Mo, Ba, Sr, Ni, Sb, and combinations thereof.

7. The heating article according to claim 1, wherein the envelope of the composite pigment grains is a mineral envelope selected from the group consisting of Zn, Al, Mg, Ca, Bi, Fe, Cr phosphates, Cr pyrophosphates, and combinations thereof.

8. The heating article according to claim 1, wherein the core of the composite pigment grains further comprises at least one thermostable pigment in liquid form or in a divided state in the form of solid particles.

9. The heating article according to claim 1, wherein the design comprises at least one binder that is thermostable at least at 300° C.

10. The heating article according to claim 9 wherein the design comprises further comprises a binder including:
a sol-gel material comprising a matrix of at least one metal polyalkoxylate and at least 5% by weight with respect to the total weight of the coating layer of at least one colloidal metal oxide dispersed in said matrix.

11. The heating article according to claim 10, wherein the thermostable binder of the design is selected from the group of a fluorocarbon resin, a mixture of fluorocarbon resins, and a mixture of fluorocarbon resins and thermostable resins.

12. The heating article according to claim 10, wherein the thermostable binder is a silicone resin or a silicone polyester resin.

13. The heating article according to claim 1, wherein the surface is at least partially covered by a continuous or non-continuous base coating, onto which the design is applied, wherein the base coating includes at least one thermostable binder resistant at least at 200° C.

14. The heating article according to claim 1, wherein at least one of the design and the surface intended and the base coating is covered with a transparent continuous finishing layer comprising at least one thermostable binder resistant at least at 200° C.

15. The heating article according to claim 14, wherein the thermostable binder of the base coating and of the finishing layer are identical and comprise a sol-gel material having a matrix comprising at least one metal polyalkoxylate and at least 5% by weight with respect to the total weight of the coating layer of at least one colloidal metal oxide dispersed in said matrix.

16. The heating article according to claim 1, wherein the design does not contain a thermostable binder.

17. The heating article according to claim 9, wherein the envelope of the composite pigment grains is a silica shell.

18. The heating article according to claim 1, wherein the thermochromic semiconducting pigment that is lipid-sensitive under heat contained in the core of the composite pigment grains is a metal oxide.

19. The heating article according to claim 18, characterized in that the thermochromic semiconducting pigment that is lipid-sensitive under heat is selected from the group consisting of $Bi_2O_3$, $Al_2O_3$, $V_2O_5$, $WO_3$, $CeO_2$, $In_2O_3$, pyrochloric semiconducting $Y_{1.84}Ca_{0.16}Ti_{1.84}V_{0.16}O_{1.84}$, and $BiVO_4$.

20. The heating article according to claim 1, wherein the mixture of a thermostable pigment and a thermochromic semiconducting pigment that is lipid-sensitive under heat is chosen from the mixtures $(Bi_2O_3+Co_3(PO_4)_2)$, $(Bi_2O_3+LiCoPO_4)$, $(Bi_2O_3+CoAl_2O_4)$, $(Y_{1.84}Ca_{0.16}Ti_{1.84}V_{0.16}O_{1.84}+Co_3(PO_4)_2)$ and $(V_2O_5+Cr_2O_3)$.

21. The heating article according to claim 1, comprising at least two patterns, each comprising a pigment composition, in which at least one of said pigment compositions of the two patterns is thermochromic.

22. The heating article according to claim 21, wherein the patterns have:
at room temperature, an initial colorimetric difference that is perceptible at room temperature, and
at a temperature of use ($T_1$) between 50° C. and 400° C., a final substantially identical colour.

23. The heating article according to claim 21, wherein the patterns have, at room temperature, an identical colour, and at a temperature of use ($T_1$) between 50° C. and 400° C., a final colorimetric difference that is perceptible to the human eye.

24. The heating article according to claim 21, wherein one of the patterns comprises a pigment composition showing a reversible change in colour at about the temperature of use ($T_1$) while the other pattern comprises a pigment composition showing a reversible change in colour around a temperature ($T_2$) greater than the temperature of use ($T_1$) of at least 40° C.

* * * * *